US011505012B2

(12) United States Patent
Saito et al.

(10) Patent No.: US 11,505,012 B2
(45) Date of Patent: Nov. 22, 2022

(54) VEHICLE WHEEL

(71) Applicant: HONDA MOTOR CO., LTD., Tokyo (JP)

(72) Inventors: Toshinobu Saito, Wako (JP); Masaaki Nishi, Wako (JP); Youichi Kamiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 845 days.

(21) Appl. No.: 16/395,475

(22) Filed: Apr. 26, 2019

(65) Prior Publication Data
US 2019/0344627 A1 Nov. 14, 2019

(30) Foreign Application Priority Data

May 8, 2018 (JP) .............................. JP2018-089720

(51) Int. Cl.
*B60C 19/00* (2006.01)
*B60B 21/12* (2006.01)
*G10K 11/172* (2006.01)
*B60B 27/00* (2006.01)

(52) U.S. Cl.
CPC ........ *B60C 19/002* (2013.01); *B60B 27/0047* (2013.01); *B60B 2900/133* (2013.01); *G10K 11/172* (2013.01)

(58) Field of Classification Search
CPC ..... B60B 21/02; B60B 21/12; B60B 27/0047; B60B 2900/133; B60C 19/002; G10K 11/172
See application file for complete search history.

(56) References Cited

U.S. PATENT DOCUMENTS

| | | | | |
|---|---|---|---|---|
| 5,891,278 | A | * | 4/1999 | Rivin .................... B60C 23/004 152/418 |
| 6,516,849 | B2 | * | 2/2003 | Flament ............. B60C 15/0236 152/520 |
| 7,152,643 | B2 | * | 12/2006 | Morinaga ................. B60B 3/02 301/6.91 |
| 2010/0096909 | A1 | * | 4/2010 | Kamiyama ............. B60B 21/12 301/95.104 |
| 2014/0346842 | A1 | | 11/2014 | Kamiyama et al. |
| 2016/0059624 | A1 | * | 3/2016 | Mohan .................... B60B 21/12 301/95.11 |
| 2020/0009922 | A1 | * | 1/2020 | Osawa .................... B60B 21/12 |

FOREIGN PATENT DOCUMENTS

| | | | | |
|---|---|---|---|---|
| DE | 202007004301 U1 | * | 8/2007 | ............. B60C 19/00 |
| DE | 102006024059 A1 | * | 11/2007 | ........... B60C 19/002 |
| DE | 102019208238 A1 | * | 12/2019 | |
| EP | 2783879 A1 | * | 10/2014 | ............. B60B 21/12 |
| JP | 2002178727 A | * | 6/2002 | ........... B60C 17/041 |
| JP | 2004090727 A | * | 3/2004 | |
| JP | 2004306714 A | * | 11/2004 | ........... B60C 19/002 |
| JP | 2004330862 A | * | 11/2004 | |
| JP | 6031425 B2 | | 11/2016 | |

(Continued)

*Primary Examiner* — Edgardo San Martin
(74) *Attorney, Agent, or Firm* — Rankin, Hill & Clark LLP (57) ABSTRACT

A vehicle wheel includes: a wheel body; a single Helmholtz resonator; and a suspension member slidably engaged with the wheel body and suspending the Helmholtz resonator inside a tire air chamber from the wheel body.

4 Claims, 6 Drawing Sheets

(56) References Cited

FOREIGN PATENT DOCUMENTS

| | | | | |
|---|---|---|---|---|
| JP | 2020066342 | A | * | 4/2020 |
| JP | 2020082809 | A | * | 6/2020 |
| JP | 2020090252 | A | * | 6/2020 |
| JP | 2020111251 | A | * | 7/2020 |
| JP | 2020111256 | A | * | 7/2020 |
| KR | 20130003589 | U | * | 6/2013 |

* cited by examiner

VEHICLE WHEEL

CROSS-REFERENCE TO RELATED APPLICATIONS

The present application claims priority under 35 U.S.C. § 119 to Japanese Patent Application No. 2018-089720, filed May 8, 2018, the contents of which are hereby incorporated by reference in their entirety.

BACKGROUND OF THE INVENTION

1. Field of the Invention

The present invention relates to a vehicle wheel.

2. Description of the Related Art

Air column resonance which occurs inside a tire air chamber formed between a tire and a wheel rim has been known as a cause of road noise of an automobile. The air column resonance is a phenomenon of air resonance that occurs in the vicinity of the resonance frequency of the tire air chamber due to vibration of the air inside the tire air chamber that is caused by random vibration inputs transmitted from the road surface to the tire tread. Through this resonance phenomenon, air column resonance noise occurs inside the tire air chamber. This air column resonance noise is transmitted to a vehicle body via a suspension, and is felt as the road noise inside a vehicle compartment.

For the purpose of reducing the road noise like this, various types of wheels have been proposed which are provided with a Helmholtz resonator having a sub-air chamber communicating with the tire air chamber via a communication hole (see, for example, Japanese Patent No. 6031425).

During the rotation of a wheel, vibration is inputted into the tire when the tire tread comes into contact with the road surface. Conventional wheels are provided with two or four communication holes arranged in a wheel circumferential direction at intervals of 90 degrees for the purpose of preventing so-called "unevenness in noise damping" of a Helmholtz resonator that occurs when vibration is inputted into the tire.

SUMMARY OF THE INVENTION

The Helmholtz resonator has a configuration such that a single sub-air chamber is assigned to a single communication hole. This means that the conventional wheel needs at least two Helmholtz resonators.

On the other hand, to meet demands for reduction of manufacturing costs, simplification of the manufacturing and the like, it is desirable to decrease the number of Helmholtz resonators to one alone. Use of only a single Helmholtz resonator, however, makes it impossible to prevent the "unevenness in noise damping," and accordingly to obtain a sufficient noise damping effect.

Against this background, an object of the present invention is to provide a vehicle wheel which is capable of achieving a sufficient noise-damping effect using only a single Helmholtz resonator.

To achieve the above object, the present invention provides a vehicle wheel including: a wheel body; a single Helmholtz resonator; and a suspension member slidably engaged with the wheel body and suspending the Helmholtz resonator inside a tire air chamber from the wheel body.

A vehicle wheel according to the present invention is capable of achieving a sufficient noise-damping effect using only a single Helmholtz resonator.

DETAILED DESCRIPTION OF THE PREFERRED EMBODIMENTS

A vehicle wheel according to an embodiment the present invention will be hereinafter described in detail with reference to the accompanying drawings as appropriate.

Incidentally, in the drawings to be referred to, "X" indicates a wheel circumferential direction, "Y" indicates a wheel width direction, and "Z" indicates a wheel radial direction.

Figure 1:
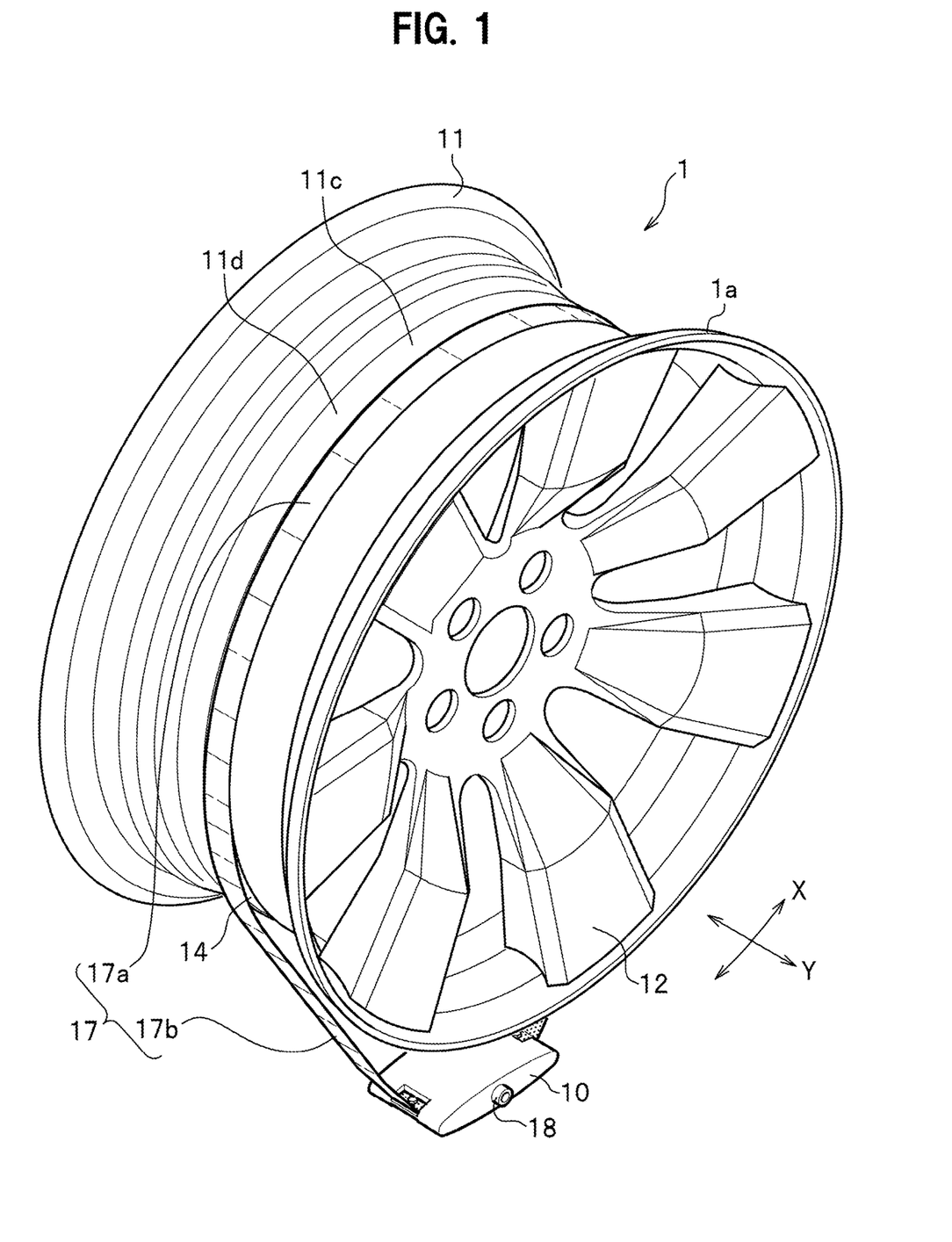
FIG. 1 is a perspective view of a vehicle wheel according to an embodiment of the present invention.
Figure 2:
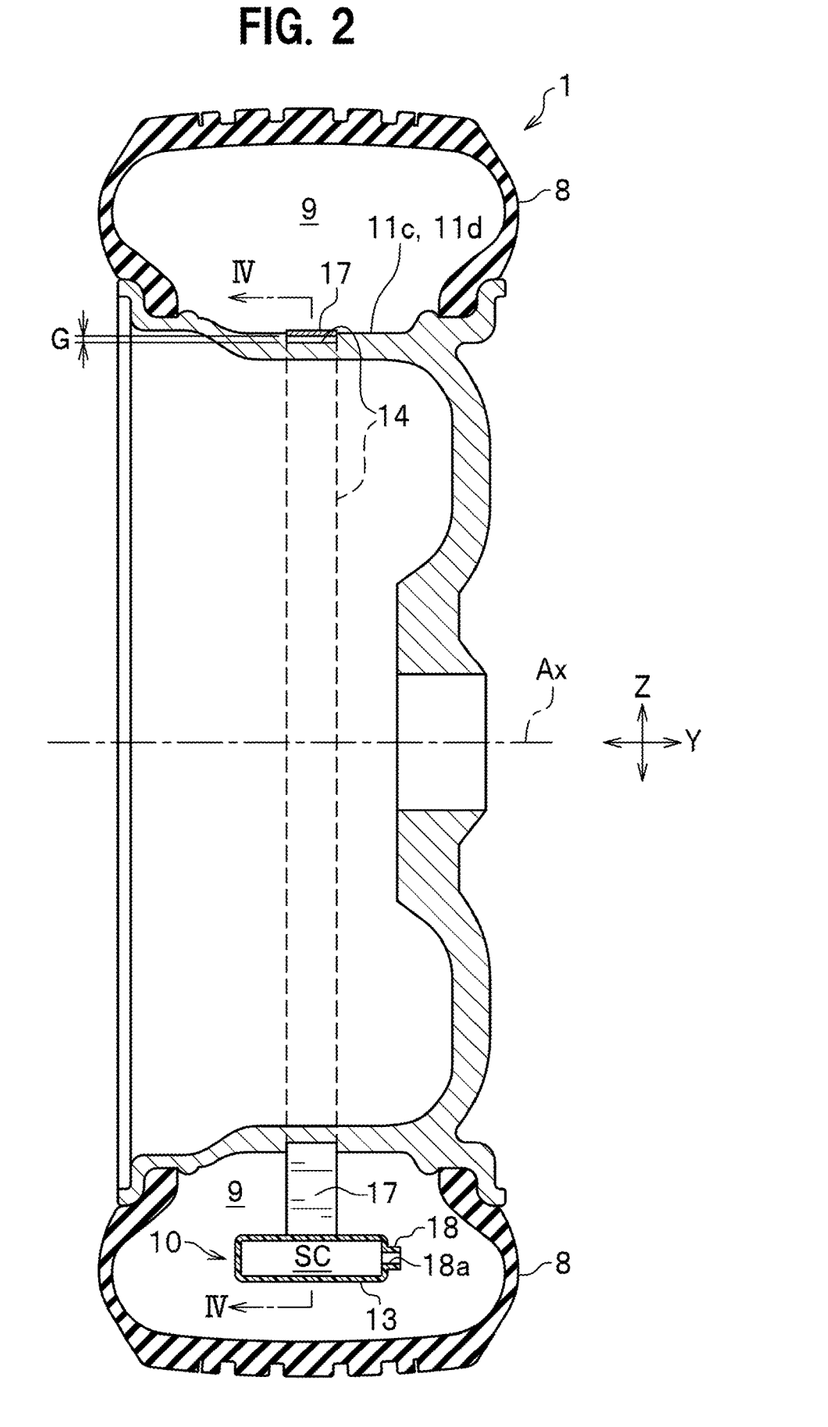
FIG. 2 is a cross-sectional view of a vehicle wheel with a tire mounted thereon, taken along a vertical plane including a wheel rotation axis.

FIG. 1 is a perspective view of a vehicle wheel 1 according to an embodiment of the present invention. FIG. 2 is a cross-sectional view of the vehicle wheel 1 with a tire 8 mounted thereon, taken along a vertical plane including a wheel rotation axis Ax.

As shown in FIG. 1, the vehicle wheel 1 according to the present embodiment includes: a single sub-air chamber member 10 serving as a Helmholtz resonator; and a suspension member 17 which places the sub-air chamber member 10 inside a tire air chamber 9 (see FIG. 2) by suspending the sub-air chamber member 10 from a wheel main body 1a.

The wheel main body 1a includes, among other things, a rim 11 on which to mount the tire 8 (see FIG. 2), and a disk 12 coupling the rim 11 to a hub (not illustrated). The wheel main body 1a according to the present embodiment is made of a light alloy, such as an aluminum alloy or a magnesium alloy.

The rim 11 has two end portions that are opposite to each other in the wheel width direction Y, at each of which a bead seat is formed, and has a well portion 11c recessed inward in the wheel radial direction (toward the center of rotation) between the bead seats. A bottom surface of this recess defines an outer peripheral surface 11d of the well portion 11c, which has a substantially constant diameter about the wheel axis along the wheel width direction Y. The outer peripheral surface 11d includes a circumferential groove 14 to house the suspension member 17.

As shown in FIG. 2, the circumferential groove 14 is located substantially in the center of the outer peripheral surface 11d of the well portion 11c in the wheel width direction Y, and extends in the wheel circumferential direction X (see FIG. 1). The circumferential groove 14 has a width and a depth which are both large enough for the suspension member 17 to be fitted into and housed in. The circumferential groove 14 has a rectangular cross-sectional shape with a shallow groove depth.

Next, a description will be given of the sub-air chamber member 10 (Helmholtz resonator).

Figure 3:
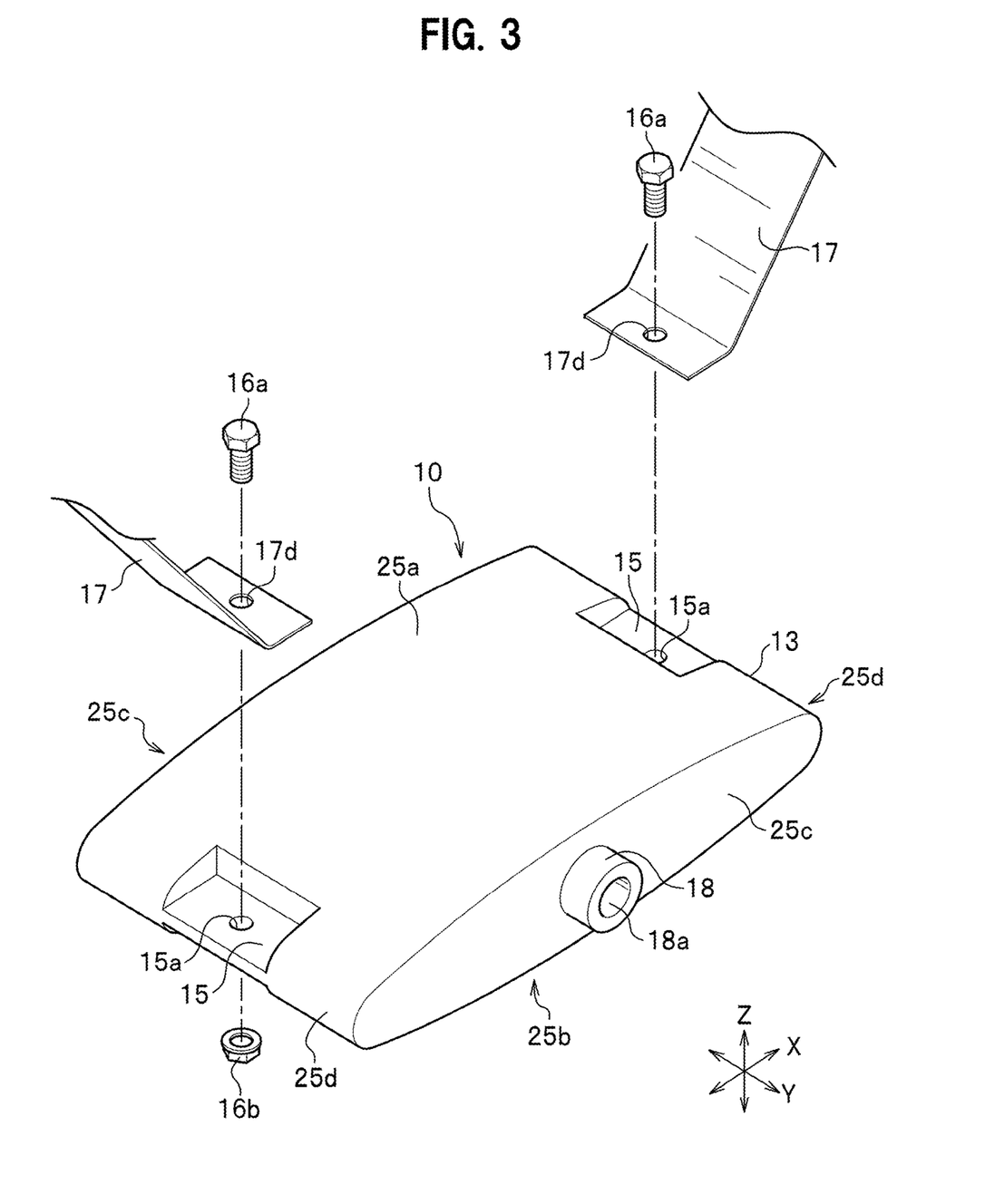
FIG. 3 is an overall perspective view of a Helmholtz resonator (sub-air chamber member).

FIG. 3 is an overall perspective view of the sub-air chamber member 10.

As shown in FIG. 3, the sub-air chamber member 10 includes a hollow main body portion 13 (resonator body) and a tube body 18.

The main body portion 13 is formed of a hollow, substantially box-shaped body which is thin in the wheel radial direction Z and long in the wheel circumferential direction X.

The main body portion 13 is formed in a streamlined shape in the wheel circumferential direction X. In other words, the main body portion 13 is gently curved such that the thickness of the main body portion 13 in the wheel radial direction Z is the largest at a central portion of the main body portion 13 that is located centrally relative to the length thereof in the wheel circumferential direction X and the thickness gradually decreases from the central portion toward the two end portions of the main body portion 13 that are opposite to each other in the wheel circumferential direction X.

The main body portion 13 includes: an upper portion 25a (upper plate) facing the outer peripheral surface 11d (see FIG. 1) of the well portion 11c (see FIG. 1); and a bottom portion 25b (bottom plate) that is located on an opposite side of the main body portion 13 from the outer peripheral surface 11d and facing the upper portion 25a.

The upper portion 25a (upper plate) is curved in a shape of an arc such that the upper portion 25a (upper plate) is convex toward the outer peripheral surface 11d (see FIG. 1). The bottom portion 25b (bottom plate) curves in a shape of an arc such that the bottom portion 25b (bottom plate) is convex toward the side opposite from the outer peripheral surface 11d. Incidentally, according to the present embodiment, curvatures of the upper and bottom portions 25a, 25b in their respective convex directions are equal to each other.

The upper portion 25a and the bottom portion 25b are connected together at two end portions of the main body portion 13 which are opposite to each other in the wheel circumferential direction X. The portions connecting between the upper and bottom parts 25a, 25b at the two end portions form R portions 25d extending in the wheel width direction Y.

The main body portion 13 further includes a pair of side portions 25c (side plates) connected to the upper portion 25a and the bottom portion 25b at their two end edges which are opposite to each other in the wheel width direction Y.

The main body portion 13 according to the present embodiment includes attachment recesses 15 formed at two ends of the main body portion 13 which are opposite to each other in the wheel circumferential direction X, and the suspension member 17 is attached to the attachment recesses 15. Each attachment recess 15 is formed of the upper portion 25a (upper plate) and the bottom portion 25b (bottom plate) being partially recessed to join to each other, at a portion of the main body portion 13 that is central with respect to the width of the main body portion 13 in the wheel width direction Y. A bolt insertion hole 15a is formed in a central portion of each attachment recess 15.

The main body portion 13 according to the present embodiment is fastened to the suspension member 17 with bolts 16a and nuts 16b. Specifically, the main body portion 13 and the suspension member 17 are joined together by screwing the bolts 16a, inserted through bolt insertion holes 17d formed in the suspension member 17 and the bolt insertion holes 15a formed in the attachment recesses 15, to the nuts 16b, respectively.

It should be noted that the joining of the main body portion 13 to the suspension member 17 is not limited to the one discussed above, as described later.

Next, a description will be given of the tube body 18 (see FIG. 1).

As shown in FIG. 1, the tube body 18 is formed on one of two end portions of the main body portion 13 which are opposite in the wheel width direction Y. According to the present embodiment, the tube body 18 is formed on the outer side of the vehicle wheel 1 (near the disk 12) to project from the main body portion 13 in the wheel width direction Y.

As shown in FIG. 3, the tube body 18 is a circular cylindrical body projecting in the wheel width direction Y from a portion of the side portion 25c (side plate) that is located centrally relative to the width of the side portion 25c in the wheel circumferential direction X and to the height of the side portion 25c in the wheel radial direction Z.

As shown in FIG. 2, a sub-air chamber SC formed inside the main body portion 13 is in communication with the tire air chamber 9 through the communication hole 18a formed inside the tube body 18.

It is assumed that this sub-air chamber member 10 (Helmholtz resonator) of the present embodiment is a product formed of a synthetic resin by blow molding or the like. However, the sub-air chamber member 10 may be made of a metal.

Examples of the synthetic resin include thermoplastic resins such as polypropylene and polyamide resin, but are not limited thereto.

Examples of the metal includes aluminum alloys, magnesium alloys and stainless steels, but are not limited thereto.

Next, a description will be given of the suspension member 17 (see FIG. 1).

As shown in FIG. 1, the suspension member 17 is formed in a belt-like body.

The suspension member 17 is ring-shaped as the two ends of the belt-like body are attached to the sub-air chamber member 10, as described above.

The suspension member 17 includes: a wound portion 17a (see FIGS. 2 and 4) wound around the outer peripheral surface 11d of the well portion 11c with a predetermined gap G (see FIGS. 2 and 4) therebetween; and extension portions 17b (see FIGS. 2 and 4) extending from two ends of the wound portion 17a toward the sub-air chamber member 10 such that the extension portions 17b leave from the outer peripheral surface 11d of the well portion 11c.

It should be noted that the suspension member 17 according to the present embodiment has high rigidity such that the suspension member 17 is less likely to bend in a thickness direction of the belt-like body. The suspension member 17 is, for example, a metal belt, a hard synthetic resin belt, or the like. In addition, although not illustrated, it is desirable that the suspension member 17 have a bead extending in a longitudinal direction of the suspension member 17.

As shown in FIG. 1, the wound portion 17a is fitted in the circumferential groove 14.

Specifically, as shown in FIG. 2, the wound portion 17a is fitted in the circumferential groove 14 of the outer peripheral surface 11d of the well portion 11c with the predetermined gap G between the wound portion 17a and the groove bottom of the circumferential groove 14.

Figure 4:
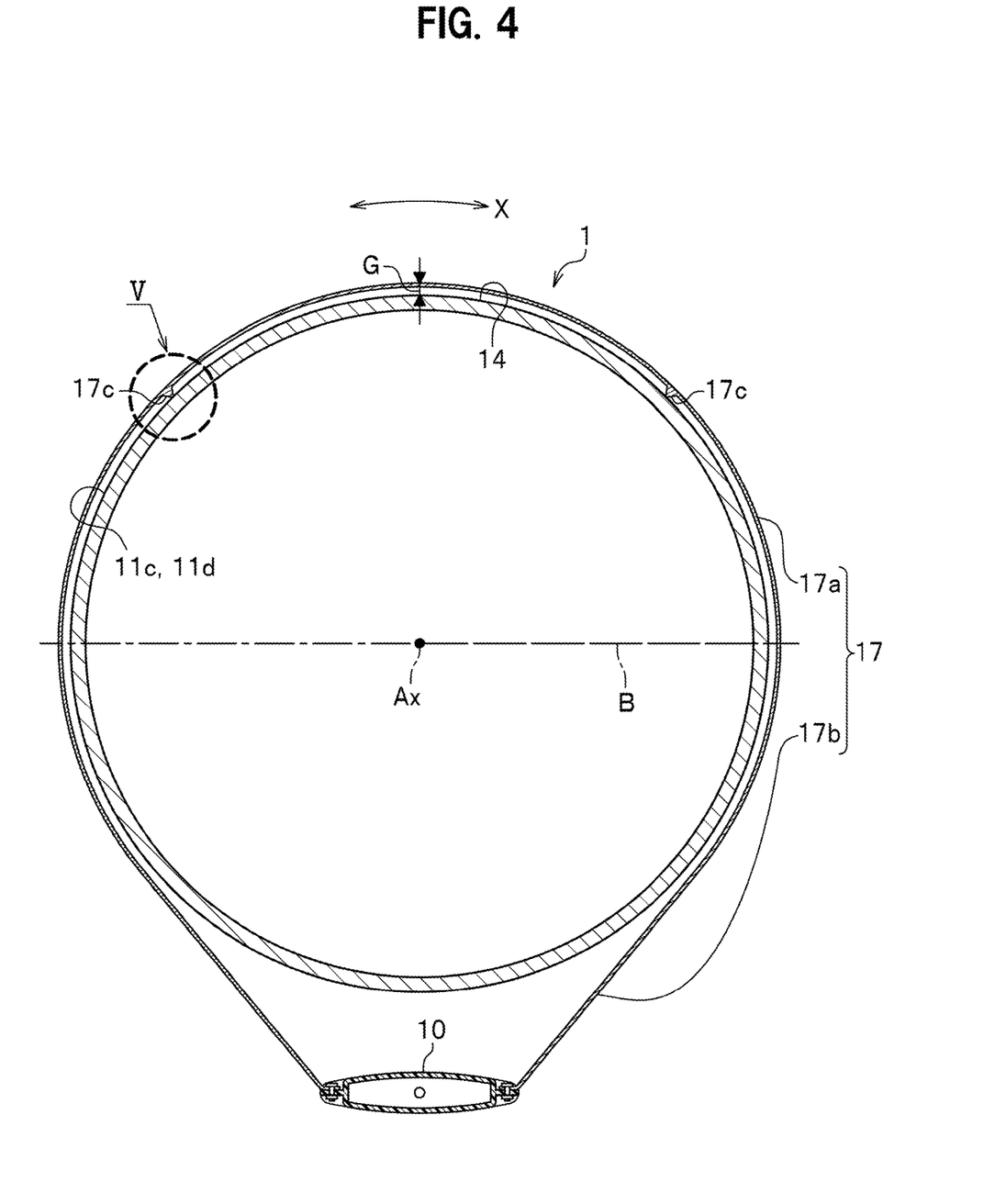
FIG. 4 is a cross-sectional view of the wheel, taken along line IV-IV in FIG. 2.

As shown in FIG. 4, the wound portion 17a of the suspension member 17 includes contact portions 17c which project toward the outer peripheral surface 11d of the well portion 11c (the groove bottom of the circumferential groove 14) to come into partial contact with the outer peripheral surface 11d.

Figure 5:
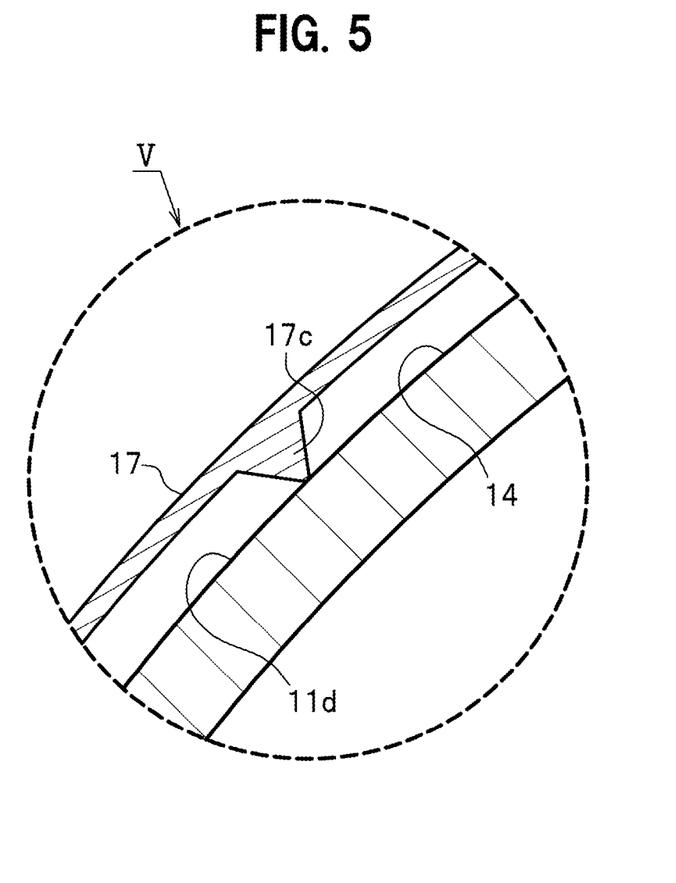
FIG. 5 is a partially enlarged view of the portion indicated with arrow V in FIG. 4.

FIG. 5 is a partially enlarged view of a portion indicated with arrow V in FIG. 4.

As shown in FIG. 5, each contact portion 17c according to the present embodiment is an apex of a projection projecting from the suspension member 17 toward the outer peripheral surface 11d (groove bottom of the circumferential groove 14). Specifically, the contact portion 17c is an apex of a conical portion formed on the suspension member 17 by press molding or the like.

Each contact portion 17c may be an apex of a pyramid or a hemisphere so long as the contact portion 17c comes into point contact with the outer peripheral surface 11d (groove bottom of the circumferential groove 14).

In addition, as shown in FIG. 4, two or more contact portions 17c are provided above a horizontal reference line B passing through the wheel rotation axis Ax. Incidentally, the contact portions 17c according to the present embodiment are located respectively at two positions each of which makes the same angle of less than 90 degrees relative to a position corresponding to 12 o'clock around the wheel rotation axis Ax, preferably at two positions each of which makes an angle of 45 degrees relative to the position corresponding to 12 o'clock. However, three or more contact portions 17c may be provided, and the number of contact portions 17c may be an even number or an odd number. In a case where the number of contact portions 17c is an odd number, one of the contact portions 17c is arranged at the position corresponding to 12 o'clock, a half of the remaining contact portions 17c are arranged to the left of 12 o'clock, and the other half are arranged to the right of 12 o'clock. In this case, the contact portions 17c are arranged to the left and right of 12 o'clock at predetermined well-balanced intervals.

As shown in FIG. 4, each of the extension portions 17b of the suspension member 17 has a distal end portion which is farthest from the outer peripheral surface 11d of the well portion 11c and attached to the sub-air chamber member 10, as discussed above.

Incidentally, the attaching of the suspension member 17 to the sub-air chamber member 10 is not limited to the above-described fastening, and may be done by joining by riveting or the like. Alternatively, the sub-air chamber member 10 and the suspension member 17 may be joined to each other by bonding, welding or the like. Alternatively, in a case where the sub-air chamber member 10 is made of a synthetic resin, the distal end portions of the suspension member 17 may be insert-molded into the sub-air chamber member 10.

Figure 6:
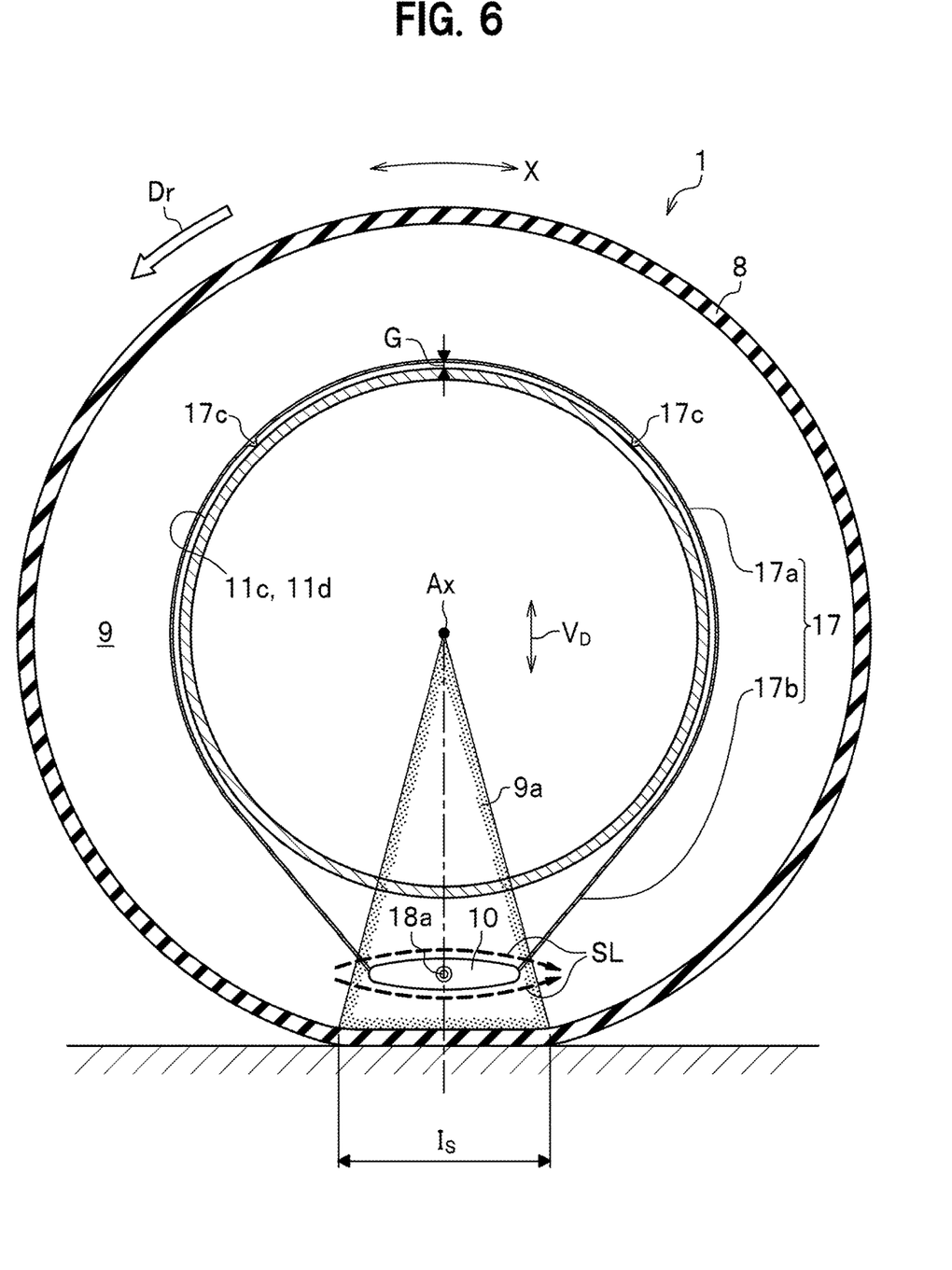
FIG. 6 is an explanatory diagram for explaining how the Helmholtz resonator (sub-air chamber member) works while the vehicle is traveling.

FIG. 6 is an explanatory diagram for explaining how the sub-air chamber member 10 (Helmholtz resonator) works while the vehicle is traveling.

As shown in FIG. 6, in the vehicle wheel 1 according to the present embodiment, the wound portion 17a of the suspension member 17 is arranged around the outer peripheral surface 11d of the well portion 11c with the predetermined gap G in between by the contact portions 17c being in point contact with the outer peripheral surface 11d. This remarkably reduces dynamic and static friction forces of the suspension member 17 against the outer peripheral surface 11d.

On the other hand, the sub-air chamber member 10 is connected to the distal end portions of the extension portions 17b. With this structure, the suspension member 17 places the sub-air chamber member 10 inside the tire air chamber 9.

In other words, even while the wheel is rotating during the traveling of the vehicle, the sub-air chamber member 10 is located near the contact portion IS of the tire 8 that is currently in contact with the ground at least by its own weight via the suspension member 17, which is configured such that the dynamic and static friction forces between the suspension member 17 and the outer peripheral surface 11d of the well portion 11c are remarkably reduced. Thus, according to the structure of the vehicle wheel 1 of the present embodiment, the sub-air chamber member 10 is always located at a position where vibrations are inputted even while the wheel is rotating.

It is preferable that, in a side view of the wheel, the communication hole 18a of the sub-air chamber member 10 be located inside an area 9a which is defined in the tire air chamber 9 by lines joining the wheel rotation axis Ax and two end portions of the contact portion IS of the tire 8 that is currently in contact with the ground (see FIG. 6). In addition, it is most preferable that, in the side view of the wheel, the communication hole 18a of the sub-air chamber member 10 be located on the vertical line passing through the wheel rotation axis Ax (see FIG. 6; reference sign VD denotes the vertical direction). With this configuration, the communication hole 18a is located such that the sub-air chamber member 10 is always located at a position where vibrations are inputted even while the wheel is rotating.

Moreover, the sub-air chamber member 10 (Helmholtz resonator) of the vehicle wheel 1 according to the present embodiment is formed in a streamlined shape and thus has a reduced air resistance coefficient (CD value) against the airflow SL occurring along and relative to the sub-air chamber member 10 in the tire 8 while the tire 8 is rotating.

It is preferable that the streamlined shape of the sub-air chamber member 10 be a shape such that the lift force inward in the wheel radial direction and the lift force outward in the wheel radial direction balance each other. This configuration stabilizes the position of the sub-air chamber member 10 in the wheel radial direction, and further reduces the dynamic and static friction forces of the suspension member 17 against the outer peripheral surface 11d of the well portion 11c. Incidentally, reference sign Dr in FIG. 6 denotes the wheel rotation direction.

Hereinafter, a description will be given of the advantageous effects of the vehicle wheel 1 according to the present embodiment.

The vehicle wheel 1 according to the present embodiment includes the single sub-air chamber member 10 (Helmholtz resonator) and the suspension member 17 slidably engaged with the outer peripheral surface 11d of the well portion 11c and suspending the sub-air chamber member 10 inside the tire air chamber 9 from the outer peripheral surface 11d.

The vehicle wheel 1 according to this structure can continuously restraining air column resonance noise without "unevenness in noise damping" by causing the sub-air chamber member 10, suspended by the suspension member 17, to remain above the contact portion IS of the tire 8 that is currently in contact with the ground.

In addition, as only the single sub-air chamber member 10 is included in the vehicle wheel 1 as a Helmholtz resonator, the cost of producing the vehicle wheel 1 can be reduced and the production process thereof can be simplified.

Furthermore, the vehicle wheel 1 of the present embodiment can reduce the friction of the suspension member 17 against the outer peripheral surface 11d, because the suspension member 17 partially contact the outer peripheral surface 11d of the well portion 11c via contact portions 17c of the suspension member 17.

According to this structure of the vehicle wheel 1, the sub-air chamber member 10 tends to move to a vertical direction downward side at least due to the weight of the sub-air chamber member 10. The vehicle wheel 1 according to this structure can reliably cause the sub-air chamber member 10 to remain above the contact portion IS of the tire 8 that is currently in contact with the ground. Thereby, the vehicle wheel 1 can continuously restrain the air column resonance noise without "unevenness in noise damping".

In addition, according to the structure of the vehicle wheel 1 of the present embodiment, the contact portions 17c of the suspension member 17, which are in contact with the outer peripheral surface 11d of the well portion 11c, are apexes of conical portions formed on the suspension member 17.

With this structure, the vehicle wheel 1 can reliably reduce the friction of the suspension member 17 against the outer peripheral surface 11d of the well portion 11c. In addition, the vehicle wheel 1 can reliably cause the sub-air chamber member 10 to remain above the contact portion IS of the tire 8 that is currently in contact with the ground.

Thereby, the vehicle wheel 1 is capable of continuously restraining the air column resonance noise without "unevenness in noise damping."

Moreover, the sub-air chamber member 10 of the vehicle wheel 1 is formed in a streamlined shape and thus has a reduced air resistance coefficient (CD value) against the airflow occurring along and relative to the sub-air chamber member 10 in the tire 8 while the tire 8 is rotating.

With this structure, the vehicle wheel 1 can restrain the sub-air chamber member 10 from being pushed downstream by the airflow occurring in the wheel rotation direction Dr.

In other words, the vehicle wheel 1 can reliably cause the sub-air chamber member 10 to remain above the contact portion IS of the tire 8 that is currently in contact with the ground even while the tire 8 is rotating.

Thereby, the vehicle wheel 1 is capable of continuously restraining the air column resonance noise without "unevenness in noise damping."

The communication hole 18a of the sub-air chamber member 10 (Helmholtz resonator) of the vehicle wheel 1 extends in the wheel width direction Y from a portion of the main body portion 13 that is located centrally relative to the length thereof along the wheel circumferential direction X.

With this structure, the vehicle wheel 1 can more reliably cause the communication hole 18a to remain above the contact portion IS of the tire 8 that is currently in contact with the ground than, for example, a vehicle wheel in which the communication hole 18a is formed on an end portion of the main body portion 13 that is located farthest in the wheel circumferential direction X.

Thereby, the vehicle wheel 1 is capable of continuously restraining the air column resonance noise without "unevenness in noise damping."

According to the structure of the vehicle wheel 1 of the present embodiment, the communication hole 18a is located on a vertical line passing through the wheel rotation axis Ax. With this structure, the vehicle wheel 1 can cause the communication hole 18a to remain always above the contact portion IS of the tire 8 that is currently in contact with the ground.

Thereby, the vehicle wheel 1 is capable of continuously restraining the air column resonance noise without "unevenness in noise damping."

Although an embodiment of the present invention has been described, the present invention is not limited to the embodiment and can be carried out in various modes.

The suspension member 17 of the embodiment has been described as being formed in a belt-like body. However, the suspension member 17 is not limited to the belt-like body so long as the suspension member 17 includes portions corresponding to the wound portion 17a and the extension portions 17b. For example, a highly rigid piece of wire may be used as the suspension member 17.

The suspension member 17 of the present embodiment has been described as being joined to the two ends of the sub-air chamber member 10 that are opposite in the wheel circumferential direction X. However, according to the present invention, the suspension member 17 may be joined to a portion of the sub-air chamber member 10 that is located centrally relative to the length thereof in the wheel circumferential direction X.

According to the above-described embodiment, the contact portions 17c are formed on the suspension member 17 for the purpose of reducing the dynamic and static friction forces of the suspension member 17 against the outer peripheral surface 11d of the well portion 11c. However, a bearing may be interposed between the outer peripheral surface 11d and the suspension member 17, in place of or in addition to the contact portions 17c.

Moreover, the outer peripheral surface 11d may be buffed to reduce the surface roughness for the purpose of reducing the dynamic and static friction forces of the suspension member 17 against the outer peripheral surface 11d. Alternatively, or in addition, resin coating (for example, fluorine resin coating or the like) may be applied to the outer peripheral surface 11d for the purpose of reducing the dynamic and static friction forces. Alternatively, or in addition, the contact portions 17c and the suspension member 17 themselves may be made of a low-friction material.

According to the above-described embodiment, the tube body 18 is formed on the outer side of the vehicle wheel 1 (near the disk 12) to project from the main body portion 13 in the wheel width direction Y. However, the tube body 18 is formed on the inner side of the vehicle wheel 1 to project from the main body portion 13 in the wheel width direction Y. Alternatively, the tube body 18 may be formed to project inward in the wheel radial direction Z from a central portion of the upper portion 25a of the main body portion 13, or may be formed to project outward in the wheel radial direction Z from a central portion of the bottom portion 25b of the main body portion 13.

What is claimed is:
1. A vehicle wheel comprising:
a wheel body;
a single Helmholtz resonator; and
a suspension member slidably engaged with the wheel body and suspending the Helmholtz resonator inside a tire air chamber from the wheel body,
wherein the suspension member partially contacts the wheel body via a contact portion of the suspension member, and
wherein the contact portion is an apex of a conical portion formed on the suspension member.
2. The vehicle wheel according to claim 1,
wherein the Helmholtz resonator is formed in a streamlined shape.
3. The vehicle wheel according to claim 1,
wherein the Helmholtz resonator has a communication hole extending in a width direction of the wheel body.

4. The vehicle wheel according to claim 1,
wherein the Helmholtz resonator has a communication hole that is located on a vertical line passing through a rotation axis of the wheel body.

\* \* \* \* \*